(12) United States Patent
Hochberg (10) Patent No.: US 10,713,734 B2
(45) Date of Patent: Jul. 14, 2020

(54) INTERVIEW SUPPLEMENTATION FOR UNIVERSAL STATE TAX RETURN

(71) Applicant: HRB Innovations, Inc., Las Vegas, NV (US)

(72) Inventor: Brenda Hochberg, Brookline, MA (US)

(73) Assignee: HRB Innovations, Inc., Las Vegas, NV (US)

( * ) Notice: Subject to any disclaimer, the term of this patent is extended or adjusted under 35 U.S.C. 154(b) by 554 days.

(21) Appl. No.: 15/018,485

(22) Filed: Feb. 8, 2016

(65) Prior Publication Data

US 2017/0228828 A1    Aug. 10, 2017

(51) Int. Cl.
*G06Q 30/04* (2012.01)
*G06Q 40/00* (2012.01)
*G06Q 50/18* (2012.01)

(52) U.S. Cl.
CPC .......... *G06Q 40/123* (2013.12); *G06Q 50/18* (2013.01)

(58) Field of Classification Search
CPC ............................. G06Q 40/123; G06Q 50/18
USPC ............................................................. 705/31
See application file for complete search history.

(56) References Cited

U.S. PATENT DOCUMENTS 8,321,312 B2 * 11/2012 Allanson ................ G06Q 40/02
235/375
2013/0080302 A1 * 3/2013 Allanson ................ G06Q 40/02
705/31

* cited by examiner

*Primary Examiner* — Hai Tran
(74) *Attorney, Agent, or Firm* — Erise IP, P.A.

(57) ABSTRACT

Method, system and medium for conducting a universal state tax interview. Provided are techniques to implement a universal state tax interview where interview questions can be skipped based on data obtained from any of a variety of federal tax interviews. Tax information and state-specific details can be imported from a tax data file for the taxpayer created based on the federal tax interview. In this way, state-level tax interviews for the taxpayer can be abbreviated or even skipped entirely, regardless of the provider of the software that conducted the federal tax interview.

12 Claims, 4 Drawing Sheets

INTERVIEW SUPPLEMENTATION FOR UNIVERSAL STATE TAX RETURN

BACKGROUND

1. Field

Embodiments of the invention generally relate to the process of tax return preparation and, in particular, to enable a universal state tax return interview that will be compatible with any federal income tax software.

2. Related Art

Separate tax interviews are required for preparing a federal tax return and for preparing each individual state return, since each state has its own specific income additions and subtractions, credits, taxes, penalties, and other items. For example, a federal return might only require a taxpayer's address, while a state level return might also require the taxpayer's school district. Similarly, when reporting interest income, a taxpayer must include interest from Treasury bills on a federal return, but may exclude it from a state-level return. Some items in the state interview have no counterpart in the federal return. For example, a state might allow a rental deduction or credit, whereas there is no federal tax break for rental payments. Accordingly, different but overlapping questions are asked during the federal and each state tax interview.

To reduce duplication of effort, many tax software companies have expanded their federal interviews to gather state information that applies to multiple states. The following are common topics where tax software companies have augmented the federal interview to handle state details: depreciation, pensions, medical expenses, interest, and dividends. Depending on decisions made by each tax software company, state information might be gathered in the federal interview to a greater or lesser degree.

In the United States there are many companies producing federal software and their own proprietary state software compatible with their federal software. Each of these companies must maintain a state program for each state with an income tax plus Washington, D.C. Some companies also maintain city income tax programs for certain cities in states including Michigan, Missouri, Ohio, Oregon, Pennsylvania, and any others with city taxes that are not integrated into the state tax returns. Each of these programs must be updated and certified annually, which is a complex and expensive process that exceeds the effort needed for the companies' federal software. Accordingly, there is a need for a universal state tax program that integrates with a plurality of different service providers of tax preparation software products. This universal state program will achieve economies of scale that are not possible for the individual tax software companies.

SUMMARY

Embodiments of the invention address the above-described need by providing for a universal state tax interview where questions are tailored based on the details of the taxpayer's federal tax interview. In particular, in a first embodiment, method of presenting a tax interview for a taxpayer's state tax return to a tax preparer, comprising the steps of importing a tax data file for the taxpayer from third-party federal tax preparation software, said tax data file including a plurality of tax data items and a corresponding plurality of state-specific details for the tax data items, identifying a needed tax data item and corresponding state-specific details needed to complete a portion of the taxpayer's state tax return, determining whether the needed tax data item and corresponding state-specific details are included in the plurality of tax data items and corresponding plurality of state-specific details for the tax data items in the tax data file, if the needed tax data item and corresponding state-specific details are included, completing the portion of the taxpayer's state tax return based on the tax data file and if the needed tax data item and corresponding state-specific details are not included, prompting the tax preparer for the needed tax data item and corresponding state-specific details and completing the portion of the taxpayer's state tax return based on a response from the tax preparer.

In a second embodiment, the invention includes a method of presenting a tax interview for a taxpayer's state tax return to a tax preparer, comprising the steps of importing a tax data file for the taxpayer including a plurality of tax data items and a corresponding plurality of state-specific details for the tax data items, determining, based on the tax data file, an identity of a third-party federal tax preparation software provider used to create the tax data file from a plurality of federal tax preparation software providers, identifying an interview question that would otherwise be presented to the tax preparer during the state tax interview, determining a response to the interview question based on a tax data item of the plurality of tax data items, state-specific details corresponding to the tax data item, and the identity of the third-party federal tax preparation software provider, as identified from the plurality of federal tax preparation software providers, used to create the tax data file, and completing the state tax return using the determined response to the interview question, without presenting the interview question to the tax preparer, wherein the federal tax return and the state tax return are prepared by different tax return preparation software.

In a third embodiment, the invention includes a universal tax return preparation system, comprising a plurality of federal tax return preparation engines, each programmed to identify an interview question to be presented to the tax preparer during the course of a tax interview, determine that a federal tax return requires the tax preparer to enter an item of tax data in response to the interview question, determine that one or more state tax returns require the tax preparer to enter the tax data and state-specific details for the item tax data, present, to the tax preparer, a modified interview question requesting the item of tax data and the state-specific details for the item of tax data, complete the federal tax return using the item of tax data; and export, in a universal file format, a tax data file including the tax data and the state-specific details for the tax data for subsequent preparation of the state tax return; and a universal state tax return preparation engine, programmed to import the tax data file, determine an identity of a federal tax return preparation engine of the plurality of federal tax return preparation engines; and prepare a state tax return, wherein the universal state tax return preparation engines is programmed to use the item of tax data, the state-specific details for the item of tax data, and the identity of the federal tax return preparation engine when preparing the state tax return.

By knowing the modifications made to the federal interview for each of a variety of federal tax software providers, the universal state tax interview can automatically be modified so as to seamlessly interoperate with the federal tax interview for each of those providers and to infer the relevant information for an individual taxpayer's tax return based on information imported from the taxpayer's federal return and information about the software from each tax software provider.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention relate to simplifying the process of preparing second and subsequent tax returns (for example, one or more state, county, city, or provincial tax returns after preparing a federal tax return) on behalf of a taxpayer, regardless of the software (or source of software) used to prepare the initial tax return. When using software to prepare a return, the tax preparer, including an individual preparing his or her own return, must provide all of the necessary information in a process called a tax interview. This information remains the same for a given taxpayer across different tax returns for the same tax-reporting period. However, different governmental taxation jurisdictions require the information in different forms, or at different levels of detail. For example, preparing a federal tax return requires knowing the taxpayer's income regardless of the state in which it was earned. However, state-level tax returns may require that the income be allocated to the state in which it was earned. Furthermore, states may vary among themselves in the form or level of detail at which they require information.

There are frequently several different tax software providers that provide tax preparation software for a given governmental taxation jurisdiction. For example, in the United States, one tax software provider is H&R Block®. H&R Block, as do many tax software providers, provide tax preparation software that assists in the tax preparation process. For a federal governmental taxation jurisdiction, for example, the tax software may present a first, federal tax interview to the taxpayer or other user. However, for secondary governmental taxation jurisdictions, such as state, county, city, provincial, etc., a second state tax interview may be needed due to the differing tax laws in these secondary jurisdictions.

Because of the different tax information needed for a federal or primary tax jurisdiction versus a state or secondary tax jurisdiction, the secondary tax interview may end up asking overlapping or redundant questions to the primary tax interview. To reduce the inefficiencies caused by asking overlapping questions in both interviews, a federal tax interview from a first tax software provider may be (or may have been) modified to ask the question at the level of detail needed for both returns. If the additional information is exported in a format that can be read by the software preparing a state tax return, the need to ask the second interview question can be avoided if the preparer used the software from the first provider. That is, if (1) a given tax software provider modified their federal interview to incorporate state tax issues, and (2) the preparer uses the tax preparation software provided by the same tax software provider for preparing both federal and state returns, then the state tax interview may be streamlined and otherwise integrated with the federal tax interview. However, state software is not typically compatible with interview data from the federal interview of another software provider. If the preparer desires to use another software provider for the state tax return, then it is highly likely the preparer will encounter an extended state tax interview that asks redundant or overlapping questions from the federal tax interview, or is missing questions. This is because a second federal tax software provider may modify the federal tax interview differently, such that interview questions that could be skipped if the preparer used federal and state return preparation software from the same provider cannot be skipped if the preparer uses a different software provider for preparing the state tax return than was used for preparing the federal return.

Thus, to streamline and simplify a universal state tax interview for the user (either the preparer or the taxpayer) to the same extent that the state tax interview for a corresponding federal provider can be streamlined and simplified, embodiments of the invention identify the federal tax interview presented to the user. More specifically, embodiments of the invention compare a needed tax data item for completing the state tax return and corresponding state-specific details with an imported tax data file to determine what information is needed for completing the state tax return. For example, if the particular state jurisdiction treats wages from active duty military differently than from other wage sources, then the needed tax data item is the total wages entered during the federal tax interview, and the state-specific detail is the share of wages attributable to the active duty military pay. If the imported data file includes the wages attributable to active duty military pay, then embodiments of the invention determine that the tax preparer does not need to be asked during the state tax interview about the source of the wages. However, if the imported data file does not provide an indication of the source of the wages, then embodiments of the invention determine that the tax preparer does need to be asked during the interview about the source of the wages. The tax data can thus be used to determine which federal tax interview questions were asked, and therefore which state tax interview questions can accordingly be skipped. In alternative embodiments, the source of the federal tax software is identified to inform the system which federal tax interview questions were asked based on configuration settings coming from the federal tax software company. In this way, the universal state (or other secondary) tax return interview can be customized not only to the taxpayer, but also based on the software used to prepare the federal tax return.

Based on this analysis of the tax data file, embodiments of the invention generate a universal secondary tax interview that complements the primary tax interview by asking only for required tax information, streamlining the questions presented to the user, and otherwise simplifying and shortening the secondary tax interview. It should be appreciated that the secondary tax interview may (and likely will) be different for each taxpayer based on the particular taxpayer's tax information and the questions asked during the federal interview, which, as noted above, are commonly different for each provider of federal tax software. This is the case even if two or more taxpayers file returns under the same primary and secondary jurisdictions. That is, embodiments of the invention automatically generate the secondary tax interview based on the tax information requested by a particular federal tax software provider, based on the tax information provided by the particular taxpayer, and based on the particular secondary jurisdiction's tax rules.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
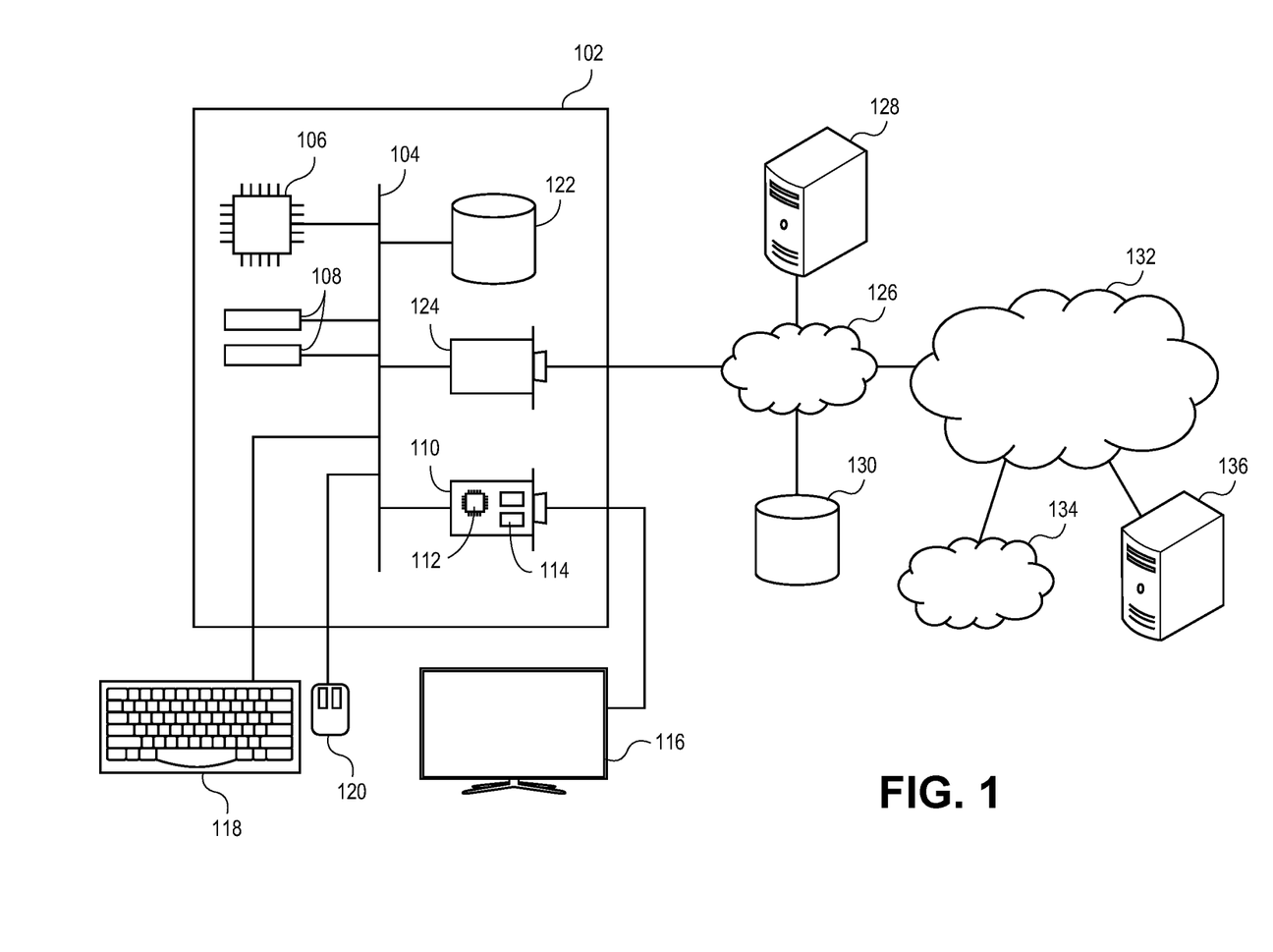
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Where reference is made to multiple data stores, data from all referenced stores may be stored together in a single data store instead. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
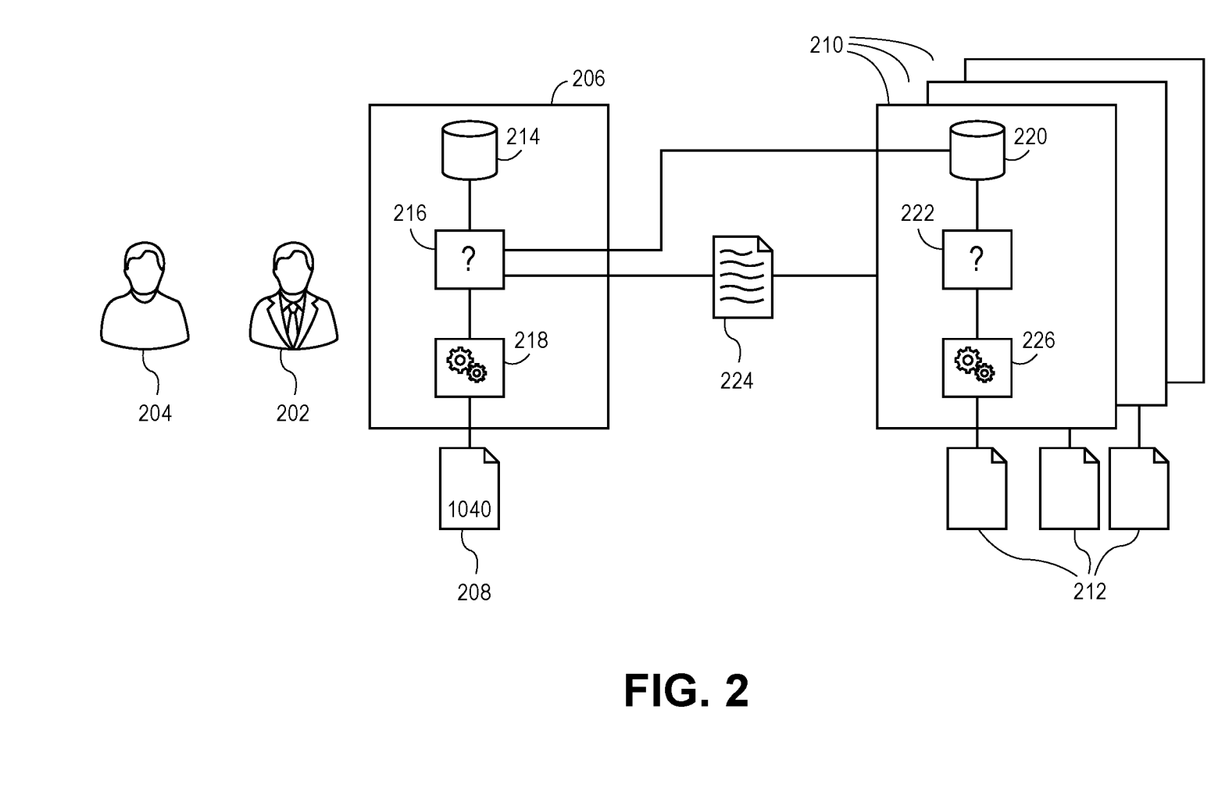
FIG. 2 depicts a system in accordance with embodiments of the invention.

Turning now to FIG. 2, a system in accordance with embodiments of the invention is depicted and referred to generally by reference numeral 200. As depicted, tax preparer 202 is preparing taxes on behalf of taxpayer 204. Tax preparer 202 may be a third party operating on behalf of taxpayer 204, such as a professional tax preparer ("tax professional") or an authorized agent of the taxpayer. In some embodiments, taxpayer 204 may instead be preparing their own tax return. Additionally, a taxpayer may comprise an individual filing singly, a couple filing jointly, a business, a self-employed filer, or any other entity that must file a tax return.

Tax preparer 202 uses federal tax preparation engine 206 to prepare federal tax return 208 and one or more state tax preparation engines 210 to prepare respective state tax returns 212 on behalf of taxpayer 204. For the sake of brevity, this specification uses the terms "federal" and "state" to refer to national level and sub-national level taxes. Thus, "federal tax interview" contemplates any national-level tax interview and "state tax return" also contemplates provincial tax returns and so forth. Similarly, further subdivisions are also contemplated. For example, county, city, or school districts may all impose their own income tax requiring the filing of a tax return, and an engine to prepare any of these returns is intended to be included in the scope of "state tax preparation engine." As used herein, "tax preparation" contemplates the entire process of gathering tax information from the taxpayer, importing tax data, completing the taxpayer's tax return for filing by filling out the necessary forms and performing the appropriate calculations, and outputting the return on approved forms or in an approved electronic format.

Broadly, it is the purpose of federal tax preparation engine 206 to prompt the user (whether the user is taxpayer 204 or tax preparer 202) for the information needed to correctly fill out federal tax return 208 and to complete the tax preparation process based on the user's responses. Correctly filling out tax forms is a notoriously difficult task using the instructions provided by government tax agencies, so federal tax preparation engine 206 use the tax interview process to break down the workflow and ask more user-friendly questions to derive the needed information.

To accomplish a streamlined and simplified tax interview, interview question data store 214 stores questions to ask the user and algorithms determining how the corresponding responses affect the tax return being prepared. For example, the interview question "Did you or your family have any medical expenses this year?" might lead to a further prompt for the user to enter the dollar amount of those medical expenses if the user answers in the affirmative. Other interview questions might be used to add or remove entire portions of the tax interview. For example, the interview question "Did you or any member of your family attend college this year?" might lead to additional questions regarding the tuition expenses, whether the student attended full time, and so on. Still other interview questions might prompt the user to import forms, such as wage statements, non-wage income statements, and expense statements.

When operating conventionally, interview engine 216 reads interview questions from interview question data store 214 and presents them to the user. Based on the user's responses, this process is repeated until one or more items of tax data are obtained. Broadly, an item of tax data is any piece of information provided by the taxpayer that is used to prepare that user's tax return. This information is then passed to return completion engine 218, which fills out the forms necessary to complete the taxpayer's tax return. Once all of the needed items of tax data has been compiled, return completion engine 218 can complete the return, and tax preparer can move on to state tax preparation engines 210 to complete the taxpayer's state tax returns.

State tax preparation engines 210 operate broadly similarly to federal tax preparation engine 206. State interview question data store 220 stores the questions used to determine the information needed to complete state tax returns 212. State interview engine 222 presents the interview questions to the user, determines items of tax data, and passes them to state return completion engine 226 to complete state returns 212. Originally, state tax preparation engines 210 operated entirely separately from federal tax preparation engine, or shared only basic demographic data. This was necessary, because (as discussed above) information is needed at a different level of granularity for state tax returns than for federal tax returns. As tax software has evolved, individual providers of tax software have increasingly integrated the interviews for the federal and state tax returns.

Thus, for example, when the interest income is originally entered in the federal return, it is advantageous if the user is given the opportunity to provide state details such as which spouse in a joint return earned the interest, and whether the interest is U.S. Treasury interest or municipal bond interest, and if the latter then further details on the issuing state. Thus, by asking a more detailed question during the federal interview, the additional information can be passed to state tax preparation engines 210, and the question can be skipped entirely during all subsequent state tax interviews. The federal tax interview may adduce these state-specific details to simplify a corresponding state tax interview by the provider of the federal tax interview; however, these state-specific details may be re-purposed to simplify a universal state tax interview instead. As discussed below and in Table 1, many types of state-level interview questions relate to federal interview questions in a similar way. Accordingly, federal interview engine 216, before presenting an interview question to tax preparer 202, determines whether one or more states require asking a similar question and, if so, presents whichever version of the question requires a more detailed answer.

To do this, federal interview engine 216 may further integrate with each state interview question data store 220 to determine whether overlapping questions exist for each question presented to the user. Where such overlap exists, state-specific details (i.e., information that would be needed to answer the more detailed question but is not needed to answer the less detailed question) can be requested from the user at the same time as the corresponding item of tax data. In some embodiments, the user may be prompted at the beginning of the tax preparation process to determine which state tax returns the taxpayer needs to file. In such cases, federal interview engine 216 may ask only the interview questions relevant for only those states. For example, if none of the states where the taxpayer must file a tax return allows the deduction of long-term care insurance premiums, the preparer is prompted only for the information needed to prepare the federal return. On the other hand, if the taxpayer must file a return in a state that offers a tax credit for certain long-term care insurance premiums, then the preparer is prompted for the state-specific details relevant to those states during the federal tax interview. In other embodiments, more detailed interview questions are asked no matter what state return(s) the taxpayer will file.

TABLE 1

| Category | Exemplary Modification of Interview Question |
|---|---|
| Residency | The federal interview might ask questions about residency and where income was earned, so that the state programs can jump start their personal information interview |
| Dependents | The federal interview might perform due diligence on dependents so that the state programs can tell if dependents are qualifying children, college students, disabled, or members of other specific categories that receive special state tax treatment |
| State and local income tax information | The federal interview might limit entries in these text boxes, so that the state programs can apply special treatment for various categories of funding contributions and local taxes (e.g., New Jersey's Family Leave Insurance, Kansas's Public Employees Retirement System (KPERS), Maryland's STPICKUP, or New York City taxes) |
| Active duty military | The federal interview might ask if wages are active duty military wages, or combat pay, which can be deductible on a state return |
| Ownership | The federal interview might find out, in a return where a married couple is filing jointly, whether each item of income and expense was owned by the taxpayer, the spouse, or both, for use in states in which the spouses' numbers are segregated |
| State tax refund | The federal interview might ask for the state that paid the refund, so that, where applicable, the state program can exclude it from income if it is from the state that is being prepared |
| Pensions | The federal interview might find out if a pension was a government pension, and what type of government pension (military, federal, state/local), since this can result in a state pension exclusion |
| Non-wage income statements | The federal interview might ask for state withholding information on non-wage income statements including unemployment and miscellaneous income, so that the state program can output the appropriate state tax forms |
| Tax-exempt interest | The federal interview might find out which state paid municipal bond interest, since that impacts the ability to exclude municipal interest on the state return |
| Treasury interest | The federal interview might separate out Treasury interest and Treasury interest dividends from other taxable interest, so that the state programs can calculate the Treasury interest subtraction |
| Nontaxable income | The federal interview might ask about certain nontaxable income including child support and government assistance, since nontaxable income impacts household income for various state credits |
| Depreciation | The federal interview might ask for more information than necessary for federal purposes, so that the state programs can calculate additions and subtractions resulting from federal/state differences in depreciation rules |
| Long-term care insurance | The federal interview might ask for long-term care insurance premiums in more detail than the federal return requires, since these premiums can be a deduction or credit on state returns |
| Medical expenses | The federal interview might ask for medical expenses regardless of whether the client might be itemizing federal deductions, and regardless of whether the medical expenses are large enough to count for the federal deduction, since some states have more lenient rules than the federal rules |
| State estimated taxes | The federal interview might ask for fourth quarter state estimated taxes paid after the end of the year, so that the client gets a credit for these on their state return |
| State estimated taxes | The federal interview might ask for the payment dates for use in the state program for figuring the underpayment penalty |

To pass information gathered in the federal tax interview by federal tax interview engine 216 to state tax preparation engine 210, tax data file 224 is used. In some embodiments, tax data 224 is in a standardized data format. For example, XML with an appropriate schema may be used. In some such embodiments, the IRS MeF (Modern e-File) format can be used, augmented as necessary to incorporate the appropriate state-level tax information. Other structured text formats or binary formats can be used instead, as long as the formatting is agreed upon by the exporting tax preparation engine and the importing tax preparation engine. It is an advantage of the present invention that utilizing a tax data file in a standardized format allows federal tax preparation engine 206 to be decoupled from state tax preparation engines 210. For example, a tax preparation software company could develop an individual state tax return preparation engine to integrate with a number of different federal tax return preparation engines. Where a preparer might be unwilling to complete two entirely separate return preparation processes, the effort saved by embodiments of the invention allows simultaneously tighter integration of the return preparation process and severing the tax engine development process for federal and state tax returns.

Figure 3:
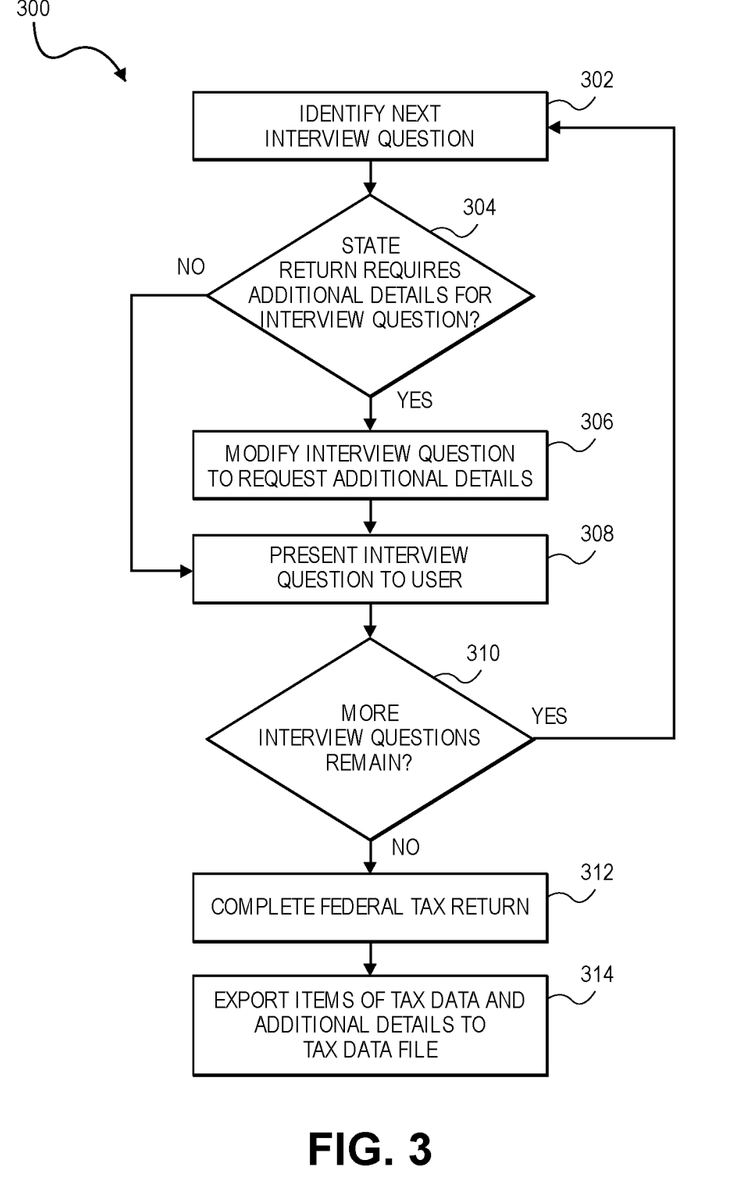
FIG. 3 depicts a flowchart illustrating a method of preparing a federal tax return in preparation for a universal state return in accordance with embodiments of the invention.

Turning now to FIG. 3, a method of preparing a federal tax return in preparation for a corresponding state return (i.e., one from the same provider as the federal return) or for a universal state return is depicted in a flowchart and referred to generally by reference numeral 300. In some embodiments, method 300 is performed by a federal tax software provider to determine state-specific details for use by that provider's state tax return software. Where the state tax return and the federal tax return are prepared by software from different providers, the federal tax return preparation software may be referred to herein as third-party federal tax preparation software with respect to the state tax return preparation software (or the universal state tax return preparation software). Initially, at a step 302, an interview question to be presented to the user is determined. As described above, interview questions may be determined on the basis of the user's response to other interview questions. In some embodiments, certain basic interview questions are presented to all users. In other embodiments, interview questions are tailored based on available information including imported tax data and entries made by the user.

Processing then proceeds to decision 304, where it is determined whether one or more state returns require state-specific details for the item of tax data requested in the interview question. Examples of such interview questions are presented above with respect to Table 1. In some embodiments, the state interview questions corresponding to federal interview questions are denoted in the interview question data store 214 and/or in the corresponding state interview question data store 220. In other embodiments, the tax return field for each item of tax data obtained by each interview question indicates one or more corresponding state interview questions that may be used in place of the federal interview question to obtain state-specific details for the appropriate state. In some embodiments, only those states for which the taxpayer must (or might have to) file a tax return are checked at this step. In other embodiments, all states are checked. If state-specific details may be required for a relevant state, processing proceeds to step 306. Otherwise processing instead skips to step 308.

At step 306, the federal interview question is modified so as to request the additional relevant data. In some embodiments, the question from the federal interview is replaced by the more detailed question from the state interview. In other embodiments, the federal interview question is expanded to further request the state-specific details. In still other embodiments, the state interview question is presented immediately after the federal question, with the combination serving as the modified interview question. Next, at step 308, the modified or unmodified interview question is presented to the user to obtain the item of tax data. In some embodiments the modification of the interview question is transparent to the user, with the modified interview questions matching the look and feel of the original federal tax interview question. In other embodiments, modified interview questions are visually distinguished from the unmodified interview questions to signal to the user that these questions will save them time later. Also at this step, the item of tax data (potentially with state-specific details) responsive to the modified or unmodified interview question is received from the user.

Next, at decision 310, it is determined whether additional interview questions remain to be asked in the federal tax interview. If so, processing returns to step 302. Otherwise processing proceeds to step 312. In some embodiments, any remaining state interview questions can be asked at this point to streamline the total interview process and help the user proceed through multiple jurisdictions' returns in the proper order. In other embodiments, state questions are deferred to state tax preparation engine(s) 210. At step 312, the items of tax data received are used by return completion engine 218 to complete federal tax return 208. In some embodiments, the completed tax return can then be printed or electronically filed at this step as well.

Processing next moves on to step 314, where the items of tax data and the state-specific details are exported to tax data file 224, as discussed above. Broadly speaking, the step of exporting the data results in writing out the data from the representation used internally by federal tax return preparation engine 206 into a universal file format that can be read by any conformant state return preparation engine 210. In some embodiments, the tax data file is stored in the taxpayer's or tax preparer's profile. In other embodiments the tax data file is provided to the user in computer-readable form.

Figure 4:
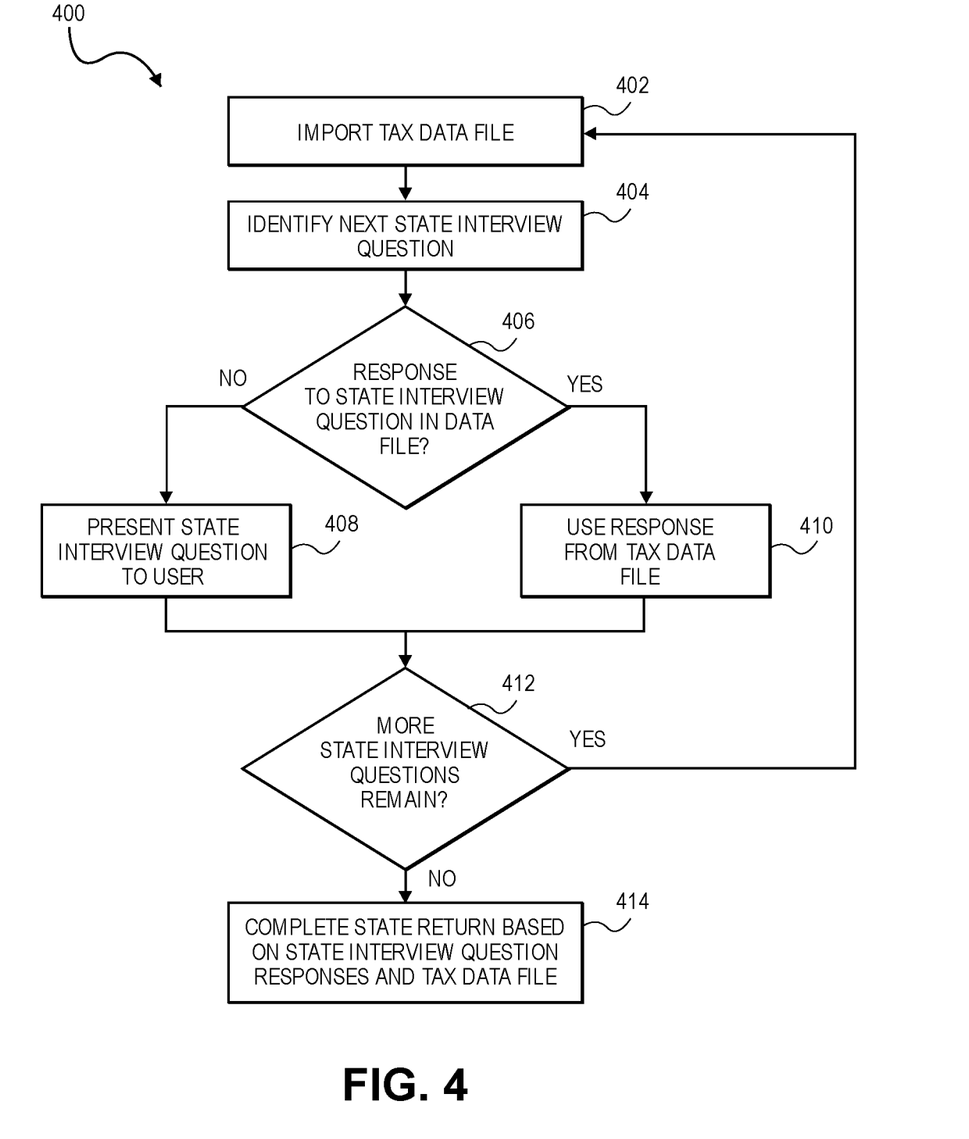
FIG. 4 depicts a flowchart illustrating an exemplary method of preparing a universal state return is depicted.

Turning now to FIG. 4, an exemplary method of preparing a universal state return is depicted in a flowchart, and referred to generally by reference numeral 400. In some embodiments, method 400 is performed immediately after method 300 using software from the same tax software provider. In other embodiments, methods 300 and 400 are completed using software from different providers. The method begins at step 402, where the tax data file 224 exported at step 314 is imported into state return preparation engine 210. Broadly, the process of importation is the reverse of the process of exportation: the data file is read in the universal file format and converted into the internal representation used by state return preparation engine 210. During this importation, additional information later used to customize the universal state tax interview can also be obtained. For example, in some embodiments the data file may include an indication of the federal tax software used to create it and the universal state program will later (e.g., at step 406) use configuration settings specific to that software to customize the state interview. In other embodiments, the universal state program will instead or in addition customize the state interview based on the presence or absence of certain federal tax data in the tax data file. Next, at step 404 a next state interview question to be answered is determined. In some embodiments, interview questions from all states for which state returns must be prepared are combined at this stage. In other embodiments, separate state return preparation engines 210 are used for each state, and the engine for that state performs method 400 separately.

Next, at decision 406, it is determined whether the items of tax data and any state-specific details responsive to this interview can be determined from tax data file 224. In some embodiments, and for some questions, this determination is simple. For example, if the tax data file includes details about retirement income's eligibility for a state subtraction, then a state pension question could be skipped. Otherwise, the question must be asked. In other embodiments and for other questions, however, whether the tax data file includes enough information to allow an interview question may depend on the federal tax software used to create it. For example, if the tax data file reports that the taxpayer did not have any medical expenses for the tax-reporting period, this could be because the taxpayer really did not have any, or it could be because the taxpayer's medical expenses fell below the federal threshold for deductibility and the preparer skipped the question. Each of these reasons could impact a state tax return differently. Thus, the determination of whether a tax interview question can be skipped may be further based on the details of the tax interview conducted by particular tax software used to prepare the federal return.

If the interview question cannot be skipped, the relevant question is presented to the user at step 408. In some embodiments, interview questions presented at this step can be augmented to request state-specific details if similar questions are present for other relevant state tax interviews, as described above with respect to method 300. The user's response of the item of tax data (potentially with the state-specific details) is also received at this step and passed to state tax return completion engine 226 to prepare state tax return 212. In some embodiments, additional information gathered at this stage is added to tax data file 224 for use in preparing subsequent state or local tax returns. Otherwise, if the relevant tax data and/or state-specific details were present in the tax data file, the information imported from the tax data file is used and passed to state return preparation engine 210 at step 410. Thus, state return preparation engine 210 can complete the state tax return using the determined response to the interview question, without presenting the interview question to the tax preparer.

Next, processing proceeds to decision 412, where it is determined whether additional questions remain in the state tax interview. If so, processing returns to step 402. Otherwise processing instead proceeds to step 414. At step 414, state tax return 212 is completed by state return preparation engine 210 using the information from the state tax interview and tax data file 224. If information for multiple state tax returns was obtained during a universal state tax interview, multiple state tax returns may be completed at step 414. Otherwise, if the taxpayer is required to file multiple state tax returns, method 400 may repeat for the remaining states.

Embodiments of the invention advantageously generate a universal state tax interview for preparation of a state tax return, regardless of the source of the federal tax interview. Therefore, embodiments of the universal state tax interview may be used with any federal tax interview provided by any tax return preparation software. The multiple companies that provide tax return preparation software do not need to maintain and certify individual state and local tax return software, which is less cost-effective than partnering with a universal state and local tax preparation software vendor. Because the universal state tax interview of embodiments of the invention responds to the degree to which each third-party federal tax return software program already incorporates state-driven questions, the universal state tax interview is compatible with the proprietary federal tax preparation software provided by the multiple tax preparation companies.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer executable instructions which, when executed by a processor, perform a method of completing a tax interview for a taxpayer's state tax return where the taxpayer's federal tax return was prepared by a third-party federal tax preparation software provider distinct from a first-party state tax return preparation software provider, comprising the steps of:
    importing a tax data file including a federal tax return prepared by the third-party federal tax preparation software provider for the taxpayer including a plurality of tax data items and a corresponding plurality of state-specific details for the tax data items;
    determining, based on the tax data file, an identity of the third-party federal tax preparation software provider used to create the tax data file from a plurality of federal tax preparation software providers;
    identifying an interview question from the state tax interview;
    determining a response to the interview question based on a tax data item of the plurality of tax data items, state-specific details corresponding to the tax data item, and the identity of the third-party federal tax preparation software provider, as identified from the plurality of federal tax preparation software providers, used to create the tax data file; and
    completing the state tax return using the determined response to the interview question, without presenting the interview question to the tax preparer,
    wherein the federal tax return and the state tax return are prepared by different tax return preparation software.

2. The method of claim 1, wherein:
    during the preparation of a federal tax return for the taxpayer, a tax interview was conducted,
    wherein the plurality of tax data items and the corresponding plurality of state-specific details for the tax data items was provided during the tax interview,
    wherein the plurality of tax data items was used in the preparation of the federal tax return, and
    wherein the corresponding plurality of state-specific details for the tax data items were not used in the preparation of the federal tax return.

3. The method of claim 1, further comprising a step of completing a second state tax return for the taxpayer using the determined response to the interview question.

4. The method of claim 1, wherein the state-specific details are specific to a state corresponding to the taxpayer's state tax return.

5. The method of claim 1, wherein the tax preparer is the taxpayer.

6. The method of claim 1, wherein the taxpayer is a married couple filing jointly, and wherein the state-specific details for the item of tax data allocate the item of tax data to one spouse of the married couple.

7. The method of claim 1, wherein the state-specific details for the item of tax data allocate the item of tax data to a particular state.

8. The method of claim 1, wherein the state-specific details of the item of tax data specify that the item of tax data is not taxable on the federal tax return, but is taxable on the state return.

9. The method of claim 1, wherein the item of tax data relates to an income statement, and wherein the state-specific details for the item of tax data include state-level withholding information for the income statement.

10. The method of claim 1, wherein the tax data item and corresponding state-specific details relate to interest income and attributing the interest income to a state respectively.

11. The method of claim 1, wherein the tax data file is in a universal file format.

12. The method of claim 1, wherein the imported federal tax return and the state tax return being prepared are for the same tax year.

\* \* \* \* \*